US012420561B2

(12) United States Patent
Tokunaga

(10) Patent No.: US 12,420,561 B2
(45) Date of Patent: Sep. 23, 2025

(54) IMAGE FORMING APPARATUS, IMAGE READING DEVICE, AND LIQUID DISCHARGE DEVICE

(71) Applicant: Yusuke Tokunaga, Kanagawa (JP)

(72) Inventor: Yusuke Tokunaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 266 days.

(21) Appl. No.: 18/202,351

(22) Filed: May 26, 2023

(65) Prior Publication Data

US 2023/0406656 A1 Dec. 21, 2023

(30) Foreign Application Priority Data

Jun. 14, 2022 (JP) ................................ 2022-095893

(51) Int. Cl.

| | |
|---|---|
| ***B41J 3/407*** | (2006.01) |
| ***B41J 2/21*** | (2006.01) |
| ***B41J 13/22*** | (2006.01) |
| *B41J 25/00* | (2006.01) |

(52) U.S. Cl.

CPC ........ *B41J 2/2135* (2013.01); *B41J 2025/008* (2013.01)

(58) Field of Classification Search

CPC .. B41J 2025/008; B41J 13/223; B41J 3/4073; B41J 3/40733

See application file for complete search history.

(56) References Cited

U.S. PATENT DOCUMENTS

| | | | | |
|---|---|---|---|---|
| 2011/0316925 A1* | 12/2011 | Saita | ...................... | B41J 2/2142 347/19 |
| 2019/0109957 A1* | 4/2019 | Date | ...................... | B41J 29/393 |
| 2019/0263159 A1* | 8/2019 | Shimomura | ............. | B41J 2/175 |
| 2023/0030207 A1 | 2/2023 | Taiki et al. | | |

FOREIGN PATENT DOCUMENTS

| | | |
|---|---|---|
| JP | 2015-119388 | 6/2015 |
| JP | 2016-105546 | 6/2016 |
| JP | 2017-183810 | 10/2017 |
| WO | WO2017/169507 A1 | 10/2017 |

* cited by examiner

*Primary Examiner* — Scott A Richmond

(74) *Attorney, Agent, or Firm* — Duft & Bornsen, PC

(57) ABSTRACT

An image forming apparatus includes a housing having an opening; a drum configured to rotate around a rotation axis to convey a medium in a conveyance direction; an image former configured to form an image on the medium on the drum; and a reader downstream of the image former in the conveyance direction, the reader configured to read the image on the medium formed by the image former. The image former and the reader are radially arranged with respect to the rotation axis of the drum. The reader is drawable from the opening of the housing along the rotation axis of the drum.

15 Claims, 7 Drawing Sheets

IMAGE FORMING APPARATUS, IMAGE READING DEVICE, AND LIQUID DISCHARGE DEVICE

CROSS-REFERENCE TO RELATED APPLICATIONS

This patent application is based on and claims priority pursuant to 35 U.S.C. § 119(a) to Japanese Patent Application No. 2022-095893, filed on Jun. 14, 2022, in the Japan Patent Office, the entire disclosure of which is hereby incorporated by reference herein.

BACKGROUND

Technical Field

The present disclosure relates to an image forming apparatus, an image reading device, and a liquid discharge device.

Related Art

Many image forming apparatuses include an image reading device that reads an image formed on a recording medium. Such image forming apparatuses provided with an image reading device serve to read and inspect an image formed on a recording medium and correct the image forming process based on the inspection results. This allows the image forming apparatuses to form higher quality image.

SUMMARY

An embodiment of the present disclosure provides an image forming apparatus includes a housing having an opening; a drum configured to rotate around a rotation axis to convey a medium in a conveyance direction; an image former configured to form an image on the medium on the drum; and a reader downstream of the image former in the conveyance direction, the reader configured to read the image on the medium formed by the image former. The image former and the reader are radially arranged with respect to the rotation axis of the drum. The reader is drawable from the opening of the housing along the rotation axis of the drum.

A liquid discharge apparatus includes a housing having an opening; a drum configured to rotate around a rotation axis to convey a medium in a conveyance direction; a liquid discharge head configured to discharge a liquid onto the medium an image on the medium on the drum; and a reader downstream of the image former in the conveyance direction, the reader configured to read the image on the medium formed by the liquid discharge head. The liquid discharge head and the reader are radially arranged with respect to the rotation axis of the drum. The reader is drawable from the opening of the housing along the rotation axis of the drum.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
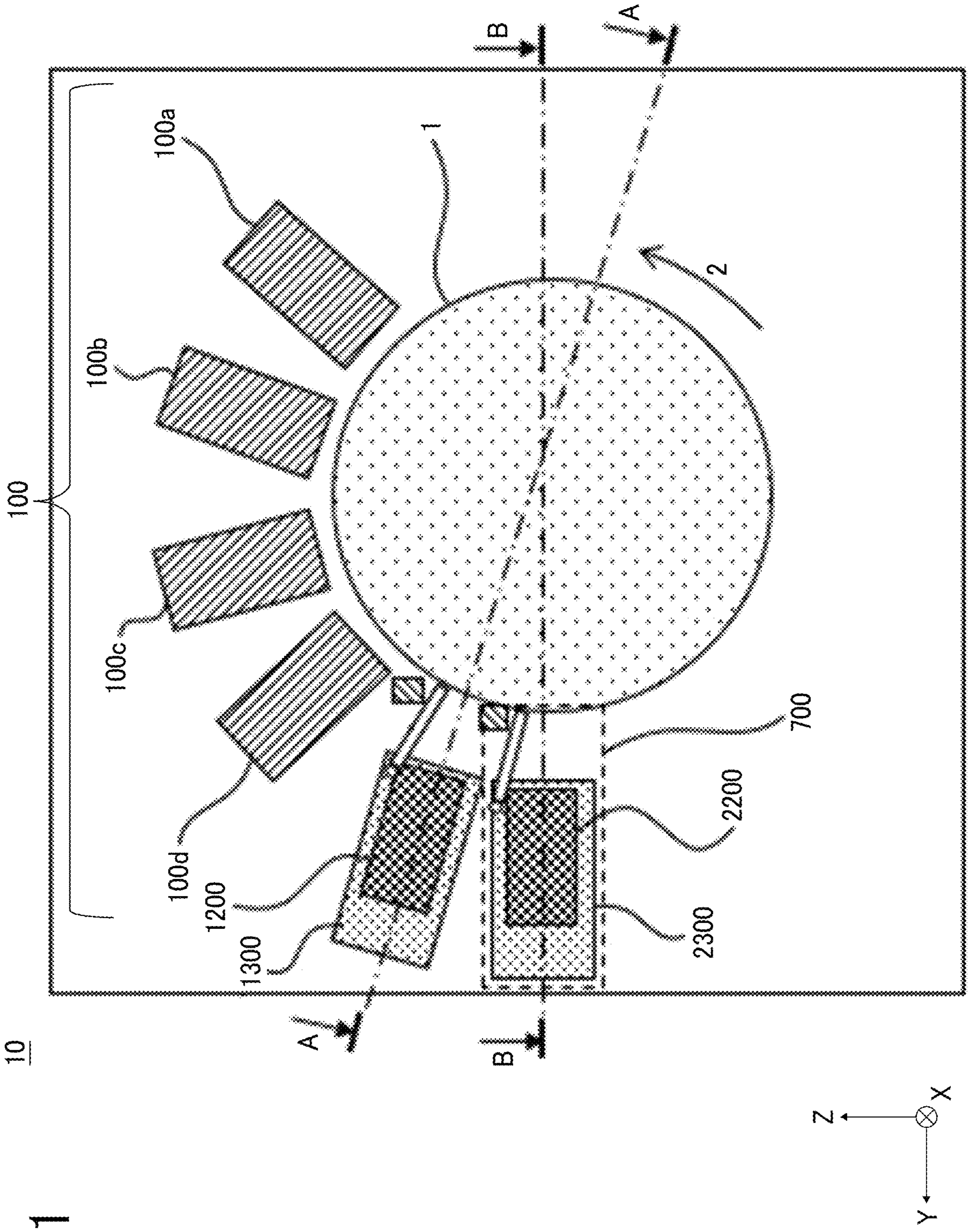
FIG. 1 is a diagram of an overall configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

Typical image forming apparatuses employ an inkjet printing system that discharges liquids to a recording medium to form an image. In an image forming process employing the inkjet printing system, a dryer may be disposed in front or rear of the image reading device (i.e., upstream or downstream of a recording medium in the conveyance direction) to dry a liquid drop attached to the recording medium. Such an arrangement limits the installation space of each device including a reading device. Particularly the image reading device, which reads images using light reflected from the image-forming surface of the recording medium after being emitted to the image-forming surface, might be difficult to adjust its orientation, e.g., to rotate to have its optical axis perpendicular to the image-forming surface. In one comparative example, an image reading device incorporating an image informing apparatus is known to include a mover that moves the scanner in a direction perpendicular to the optical axis of the reference plane and in a direction parallel to the optical axis. Such an image reading device can obtain a desired white reference data irrespective of the limitations on the installation space.

In another comparative example, the image forming apparatus, which includes multiple scanners (or image reading devices) arranged in a staggered manner, connects multiple images read by the multiple scanners to each other to obtain a document image having no joint misalignment.

In the image forming apparatus according to said one comparative example, the image former, the image reading device, and another device are arranged in the conveyance direction of the recording medium. The selection of the arrangement of the image reading device may be limited depending on the relative position between the devices. Particularly when the multiple image reading devices are arranged in the conveyance direction in the image forming apparatus according to said another comparative example, at least one scanner is disposed at a position that is not suitable for maintenance or a position that is difficult for a user to reach. If the image reading device is disposed at such a position that is difficult for a user to reach, it is difficult to remove dirt adhering to the image reading mechanism. In other words, the configurations according to the comparative examples as described above have a challenge in cleaning the image reading device included in the image forming apparatus.

Embodiments of the present disclosure achieve higher efficiency in cleaning the image reading device.

Configuration Example of Image Forming Apparatus

FIG. 1 is a diagram of an overall configuration of an image forming apparatus 10 according to an embodiment of the present disclosure. In FIG. 1, a Z-axis direction is a direction (or a vertical direction) vertical to an installation surface on which the image forming apparatus is installed. Further, an X-axis direction is a front-rear direction or the depth direction of the image forming apparatus 10, being orthogonal to the Z-axis direction. A Y-axis direction is a left-right direction orthogonal to each of the Z-axis direction and the X-axis direction in a plane parallel to the drawing sheet of FIG. 1. The Y-axis direction corresponds to a conveyance direction 2 (in FIG. 1) of the recording medium in the present embodiment. In the present disclosure, the X-axis direction may be simply referred to as an orthogonal direction. In the following described example, the orthogonal direction (i.e., the X-axis direction) is coincident with a rotation axis, i.e., the axial direction of a drum-shaped member (or a drum-shaped body).

The image forming apparatus 10 includes a drum-shaped conveyor that conveys a recording medium. In the present disclosure, the recording medium is referred to as a sheet. Further, the drum-shaped member is referred to as a drum 1.

The sheet is conveyed in a predetermined direction along the outer circumferential surface of the drum 1, and an image is formed on the sheet by an image former during the conveyance.

The image forming apparatus 10 includes an image former 100 including a first inkjet head 100*a*, a second inkjet head 100*b*, a third inkjet head 100*c*, and a fourth inkjet head 100*d*, which are arranged along the outer circumferential surface of the drum 1. The image former 100 may include multiple inkjet heads, or may include a single inkjet head. The image former 100 may be configured to include a device other than the inkjet head.

The first inkjet head 100*a*, the second inkjet head 100*b*, the third inkjet head 100*c*, and the fourth inkjet head 100*d* form a liquid discharge head that discharges different colors of ink to a sheet. The image former 100 forms an image with different colors of ink.

In the following description, the first inkjet head 100*a*, the second inkjet head 100*b*, the third inkjet head 100*c*, and the fourth inkjet head 100*d* are collectively and simply referred to as inkjet heads.

In the following described example, the image forming apparatus 10 employs an inkjet printing system to form images. However, the image forming apparatus 10 may employ another system other than the inkjet printing system. For example, the image forming apparatus 10 employs a toner system to form images.

FIG. 1 illustrates elements used to describe the embodiments of the present disclosure, but the image forming apparatus 10 includes a configuration other than the configuration illustrated in FIG. 1. In some examples, the image forming apparatus 10 further includes a pre-processing device that executes processing (pre-processing) on a sheet before image formation, a post-processing device that executes processing (post-processing) on the sheet after image formation, a sensor that detects the state of the sheet, and another sensor or functions for executing other processing functions.

Arrangement of Image Former and Reader

In the image forming apparatus 10, the drum 1 rotates in the conveyance direction 2 to convey a recording medium.

The inkjet heads are arranged along the outer circumferential surface of the drum 1 at predetermined intervals. An image is formed in response to the adhesion of ink discharged from the inkjet head onto the sheet conveyed by the drum 1 in the conveyance direction 2.

A scanner as an image reading device is disposed downstream of the inkjet head in the conveyance direction 2. As illustrated in FIG. 1, the inkjet heads are arranged radially to the drum 1.

The image forming apparatus 10 includes multiple scanners, a first scanner 1200 and a second scanner 2200, which are arranged radially to the drum 1.

In the following described example, a reader 30 (FIG. 2) of the image forming apparatus 10 includes the second scanner 2200. In at least one example, the reader 30 includes a device other than the second scanner 2200.

Upon receiving an input image, the drum 1 and a conveyor roller convey a sheet in the conveyance direction 2 in the image forming apparatus 10. Based on the input image, the inkjet heads discharge inks onto the sheet to form an image. After the image formation, the sheet may be subjected to post-processing such as drying. The input image may be subjected to image processing by an arithmetic device.

In the following description, the image forming apparatus 10 includes two scanners (the first scanner 1200 and the second scanner 2200). However, the number of scanners as image reading device is not limited to two, and may be one or three or more.

In the image forming apparatus 10, the two scanners 1200 and 2200 are supported by different structures. For example, the first scanner 1200 is supported by the first support housing 1300. Similarly, the second scanner 2200 is supported by the second support housing 2300.

Each of the first support housing 1300 and the second support housing 2300 is a part of a housing constituting the image forming apparatus 10. The first support housing 1300 and the second support housing 2300 support structures arranged radially along the outer circumferential surface at predetermined positions with predetermined orientations.

In this configuration, the first support housing 1300 and the second support housing 2300 are both arranged radially to the drum 1 and between the structures arranged on the outer circumferential surface of the drum 1.

The first scanner 1200 and the second scanner 2200 read an image formed by the inkjet heads, i.e., after the formation of the image by the inkjet head. In view of such processing flow, the first scanner 1200 and the second scanner 2200 are disposed downstream of the inkjet head in the conveyance direction 2.

In response to generating image data for inspection, based on the image read by the first scanner 1200 and the second scanner 2200, the image forming apparatus 10 corrects the image data for inspection in the image forming processing.

In this configuration, the first scanner 1200 and the second scanner 2200 are at positions that allow reading of the image immediately after the formation of the image by the inkjet heads.

Such an arrangement of the first scanner 1200 and the second scanner 2200 enables the first scanner 1200 and the second scanner 2200 to quickly read the image formed by the inkjet heads and allows a higher quality of the image formed by the image forming apparatus by correcting image data using the reading results. Further, the first scanner 1200 and the second scanner 2200 are disposed substantially downstream of the inkjet head in the conveyance direction 2. This easily eliminates the influence on the conveyance accuracy of the sheet and may further increase the inspection accuracy.

To arrange the first scanner 1200 and the second scanner 2200 at positions downstream of the inkjet head in the conveyance direction 2, the first scanner 1200 and the second scanner 2200 are arranged radially to the drum 1.

As described above, similarly to the inkjet heads, the first scanner 1200 and the second scanner 2200 are disposed radially to the drum 1 and disposed in the vicinity of the inkjet heads.

In the image forming apparatus 10, a peripheral device such as a dryer may be disposed downstream of the inkjet head. However, the arrangement of the first scanner 1200 and the second scanner 2200 radially to the drum 1 allows a layout of the first scanner 1200 and the second scanner 2200 downstream of and in the vicinity of the inkjet heads in the conveyance direction 2.

Configuration Example of Reader

Figure 2:
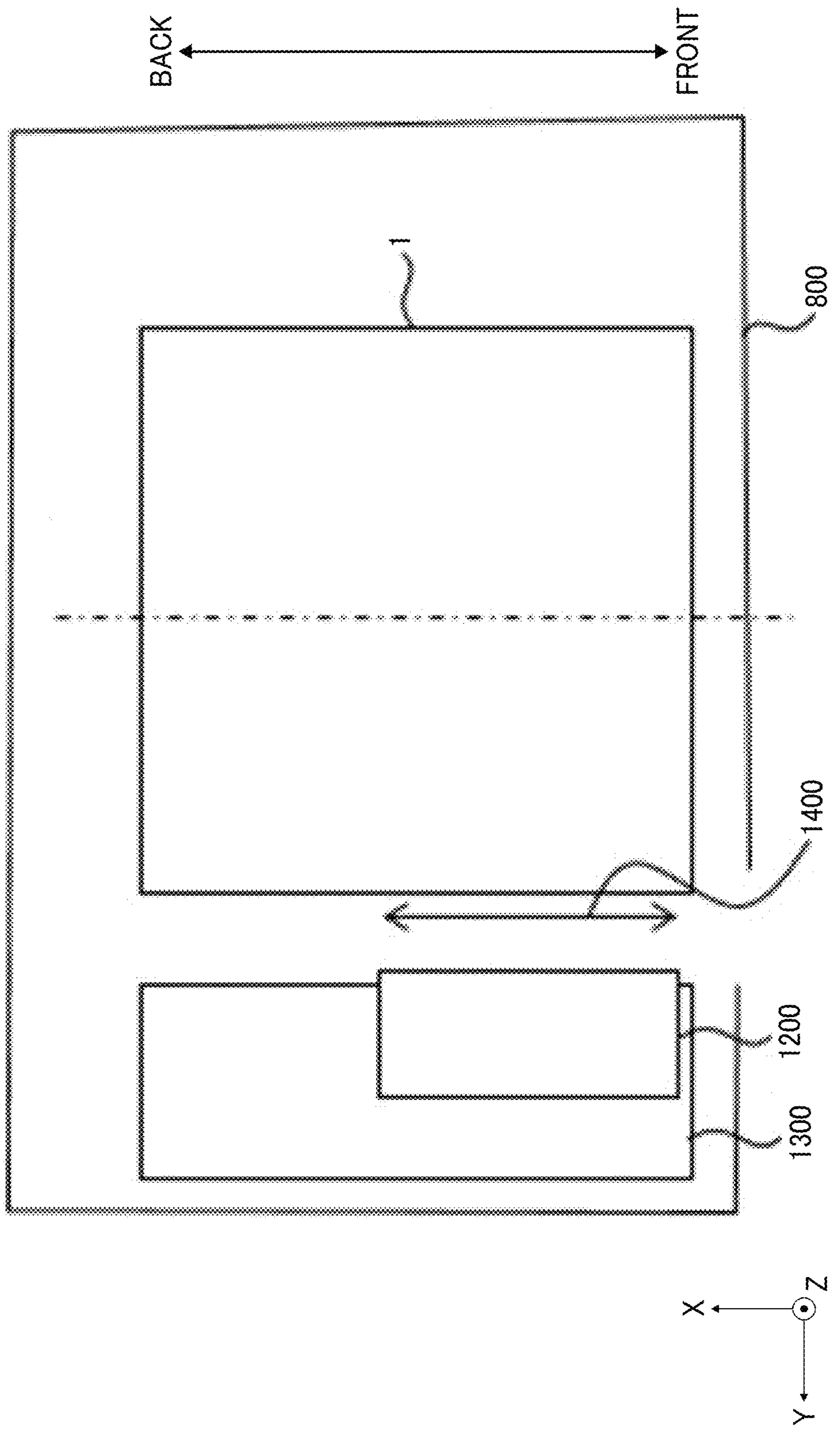
FIG. 2 is a diagram of an arrangement of a first scanner according to an embodiment.

FIG. 2 is a diagram of the arrangement of the first scanner 1200 according to an embodiment of the present disclosure. FIG. 2 is a cross-sectional view of the image forming apparatus 10 taken along line A-A in FIG. 1.

Figure 3:
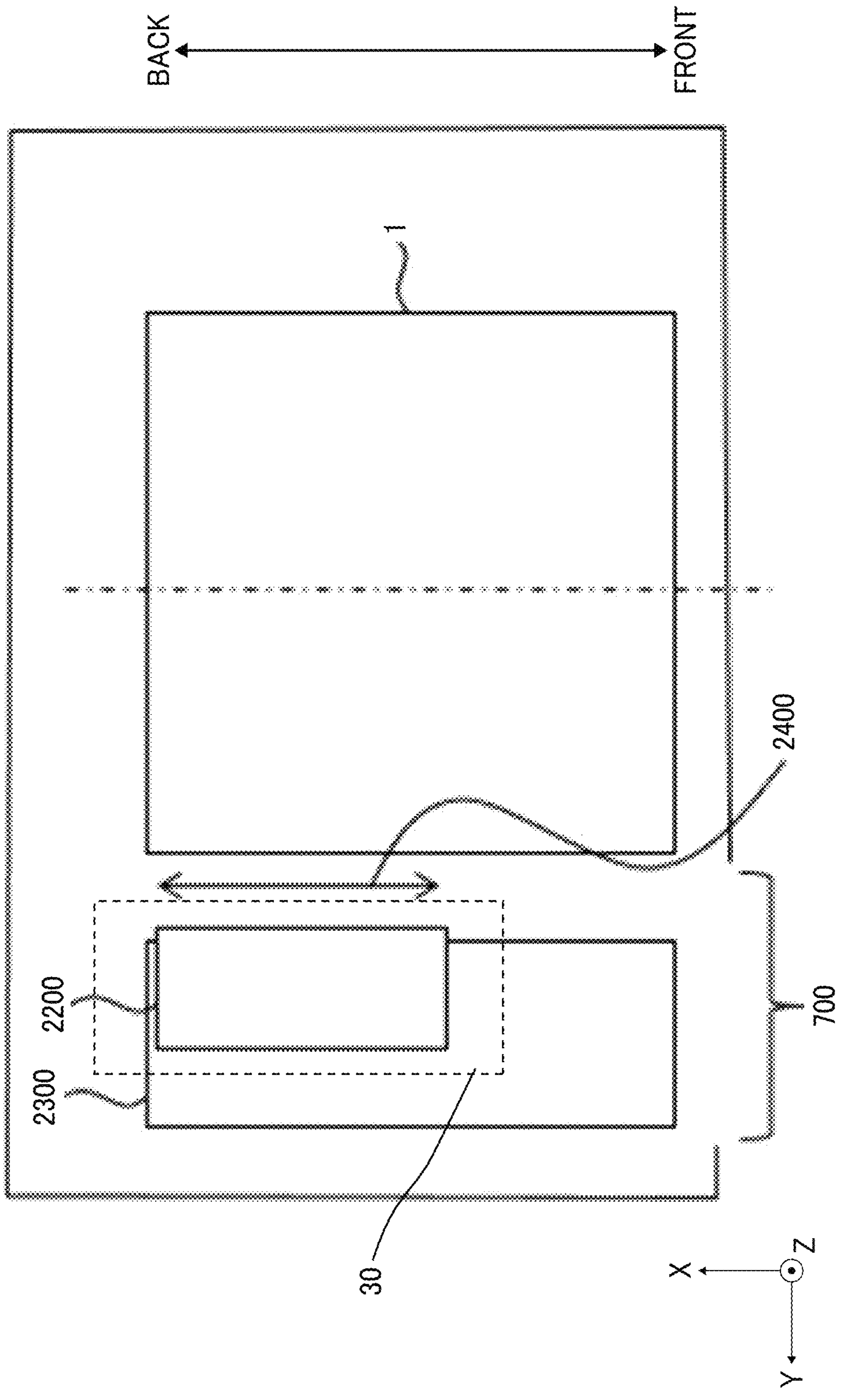
FIG. 3 is a diagram of an arrangement of a second scanner according to an embodiment.

FIG. 3 is a diagram of the arrangement of the second scanner 2200 according to an embodiment of the present disclosure. FIG. 3 is a cross-sectional view of the image forming apparatus 10 taken along line B-B in FIG. 1.

The first scanner 1200 and the second scanner 2200 are in-line scanners that read an image in the width direction (i.e., a direction orthogonal to the conveyance direction 2) of the sheet with respect to the conveyance direction 2 (see FIG. 1).

The reading areas in the width direction of the sheet set for the first scanner 1200 and the second scanner 2200 are different from each other.

In the following description, the reading area set for the first scanner 1200 is a first area 1400 in FIG. 2. The reading area set for the second scanner 2200 is a second area 2400 in FIG. 3.

This configuration enables reading of the entire range of the image formed on the sheet by the image forming apparatus 10 by combining the reading results of the first area 1400 and the second area 2400 together.

In the image forming apparatus 10 according to the present embodiment, reading the first area 1400 and the second area 2400 different from the first area 1400 in the direction (i.e., the width direction of the sheet) orthogonal to the conveyance direction 2 enables a wider entire image reading range and a higher overall reading accuracy irrespective of the use of an inexpensive device that, when used alone, has a limited image reading range. In some examples, the image forming apparatus 10 uses a single reader set to read the entire width of the sheet as the image reading area.

In the present embodiment as described above, the image forming apparatus 10 uses multiple readers: the first scanner 1200 and the second scanner 2200. This configuration enables an image formed on a sheet of, for example, A3 size, B2 size, or a larger size to be read by the image forming apparatus 10. However, the number, arrangement, and reading range of the image reading device may be set in accordance with the size of a sheet to be read.

In the following described examples as illustrated in FIGS. 2 and 3, the relative position between the first area 1400 and the second area 2400 is such that in the –axis direction, the first area 1400 is on the front side, and the second area 2400 is on the backside.

In the arrangement as illustrated in FIG. 3, the second scanner 2200 is on the backside, which means that the second scanner 2200 is away from an opening 700 in the front area of the housing 800 of the image forming apparatus 10.

The opening 700 serves as an entrance for a user to insert his or her hand for maintenance for cleaning the first scanner 1200 or the second scanner 2200. The maintenance for cleaning the first scanner 1200 and the second scanner 2200 uses the opening 700.

The position of the opening 700 is restricted by the relative position between the opening 700 and the support housings supporting the structures arranged radially to the drum 1.

The opening 700 is formed in a housing 800 surrounding the first scanner 1200 and the second scanner 2200.

Configuration of Image Reading Device

Figure 4:
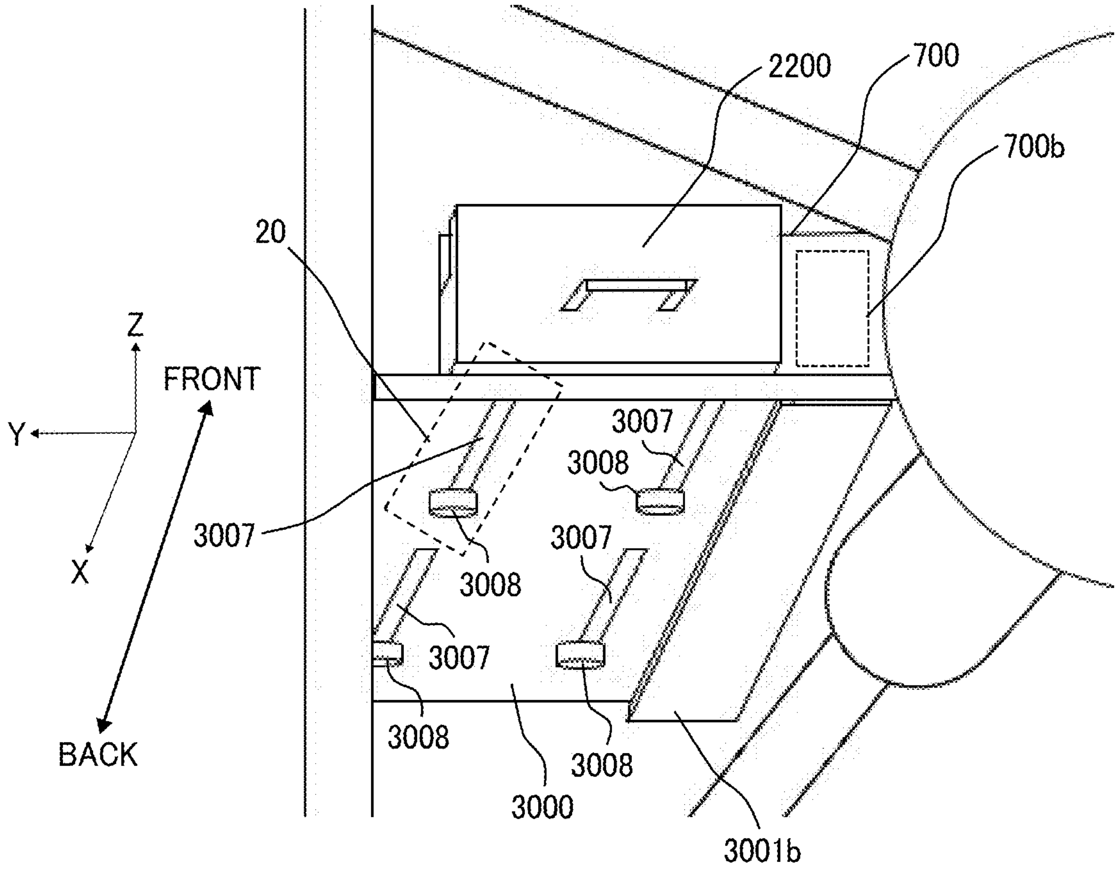
FIG. 4 is a diagram of a configuration of moving the second scanner in FIG. 3.

FIG. 4 is a diagram of a configuration of moving the second scanner 2200 in FIG. 3, according to an embodiment of the present disclosure. A mover 20 as a mechanism allows movement of the second scanner 2200 to the front as described below. In the following described example, the mover 20 is a groove 3007 formed in a shield plate 3000. However, the mover 20 may be configured by a mechanism other than the groove 3007.

Figure 5:
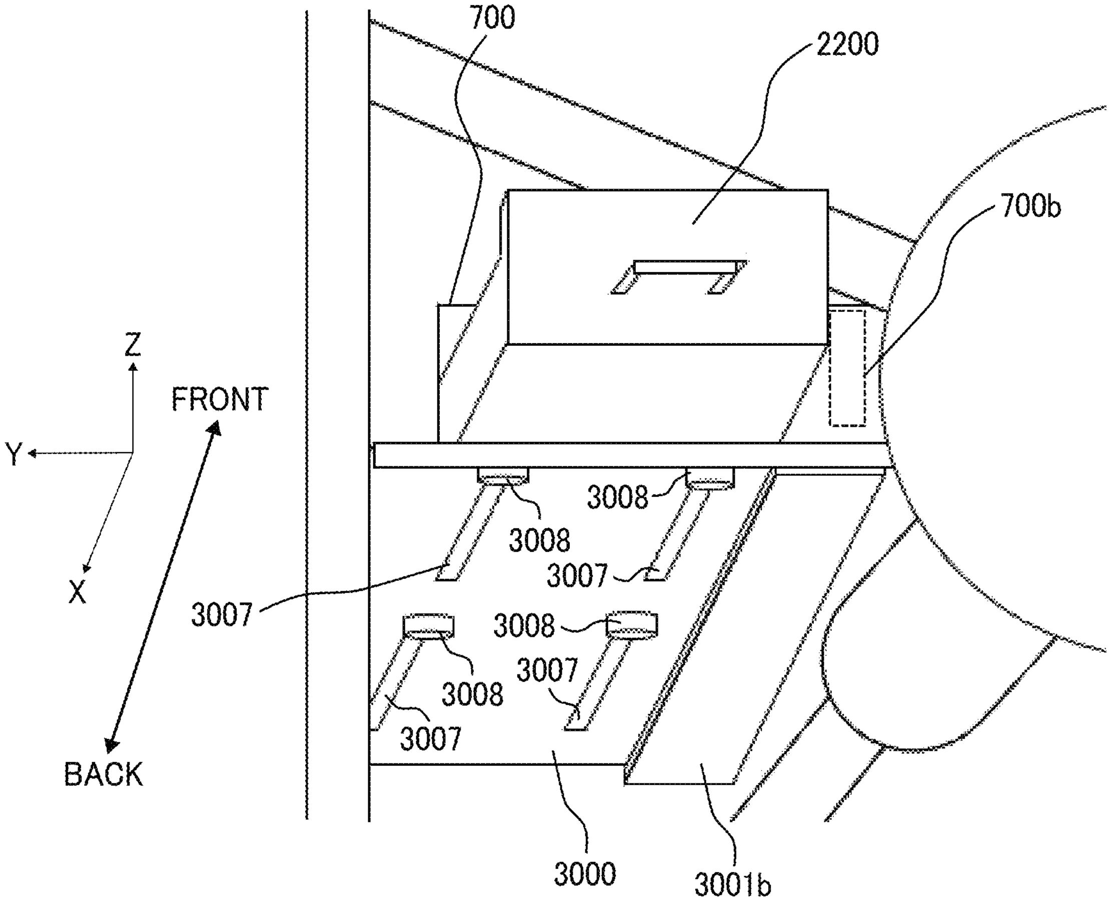
FIG. 5 is a diagram of the second scanner that has been moved, according to an embodiment of the present disclosure.

FIG. 5 is a diagram of the second scanner 2200 that has been moved, according to an embodiment of the present disclosure. FIG. 5 differs from FIG. 4 in that the second scanner 2200 is moved from the position in FIG. 4 to the front. As described above, the mover 20 is, for example, a slider that moves the second scanner 2200 in the X-axis direction.

Specifically, the second scanner 2200 moves on the shield plate 3000 in the X-axis direction. The groove 3007 is formed in the shield plate 3000. In this configuration, the second scanner 2200 is moved in parallel along the groove 3007. Note that the first scanner 1200 may be provided with a support portion other than the shield plate 3000.

Such a configuration that moves the second scanner 2200 in parallel to the front moves the second scanner 2200 to a position that allows an effective cleaning for maintenance.

In other words, this configuration moves the second scanner 2200 on the backside during the image-forming operation to a position that allows a user to easily reach the second scanner 2200 for maintenance.

Further, since the first scanner 1200 and the second scanner 2200 each include an optical component in the configuration that reads an image, the reading accuracy is degraded by contaminated optical component. In particular, since ink mist is likely to be generated in the vicinity of the inkjet head, if the ink mist adheres to the optical component, image reading accuracy is adversely affected.

In addition to the ink mist, dust also causes contamination of the optical component.

The second scanner 2200 is drawn by the mover 20 to the front for maintenance. This configuration moves the second scanner 2200 at the backside during the image-forming operation to a position that allows a user to easily reach the second scanner 2200 for cleaning. This enables higher efficiency in user cleaning.

The mover 20 may be a mechanism other than the above-described mechanism. For example, the mover 20 may be configured to use an actuator. Further, when the image forming apparatus 10 includes multiple scanners, the mover 20 moves any one of the scanners or all of the scanners as described below.

The mover 20 allows movement of the second scanner 2200 by half or more of the total length of the second scanner 2200 to the front. Such a movement of the second scanner 2200 by a half or more of the total length of the second scanner 2200 to the front for cleaning allows the user to easily visually confirm whether the second scanner 2200 has been sufficiently cleaned.

The movable distance of the second scanner 2200 is variable with the total length of the second scanner 2200. For a second scanner 2200 having a long total length, the second scanner 2200 is further back on the housing during the image-forming operation. To clean such a second scanner 2200 having a long total length, the mover 20 is configured to move the second scanner 2200 by a longer distance. For the second scanner 2200 having approximately 800 mm in total, for example, the mover 20 is configured to move the second scanner 2200 by 400 mm or longer distance.

The mover 20 includes a mechanism that restricts the movement of the second scanner by a predetermined distance or longer to prevent the second scanner 2200 from being detached from the housing 800 of the image forming apparatus 10 when the second scanner 2200 is drawn to the front.

Specifically, the mover 20 includes a pin 3008. As illustrated in FIGS. 3 and 4, the pin 3008 is moved with the movement of the second scanner 2200. The pin 3008 is slidably fitted into the groove 3007 formed in the shield plate 3000.

In response to the movement of the second scanner 2200 to the front by the mover 20, the pin 3008 stops at the edge of the groove 3007 to prevent excessive movement of the second scanner 2200. In other words, the movement distance of the second scanner 2200 is limited by the length of the groove 3007.

The predetermined distance as the upper limit of the movement distance of the second scanner 2200 is set based on the weight, the center of gravity, and the like of the second scanner 2200. Specifically, when a second scanner 2200 having a significant weight is pulled forward a long distance, the weight of the second scanner 2200 may cause the image forming apparatus to fall down or the shield plate 3000 to bend. Restricting the movement of the second scanner 2200 by a predetermined distance or more to deal with such a situation prevents the troubles as described above.

The image forming apparatus 10 includes a workspace 700*b* around the second scanner 2200.

The workspace 700*b* provides a wider space to move a user's hand or a cleaning tool and thus facilitates cleaning. As illustrated in FIGS. 4 and 5, the workspace 700*b* is provided between the outer circumferential surface of the drum 1 and the second scanner 2200. This allows a portion closer to the drum 1, to which more dirt adheres, in the second scanner 2 to be cleaned.

Support Portion

The shield plate 3000 is preferably made of a material including a practical metal such as aluminum, stainless steel, or magnesium. Such a practical metal provides strength sufficient to support a device including a reader by a cantilever structure when the reader is pulled out, and also reduce costs.

In addition, the shield plate 3000 preferably includes a thermal insulating material. The first scanner 1200 and the second scanner 2200 each include an optical component. A change in temperature affects the optical characteristics. To prevent such an effect on the optical characteristics due to a change in temperature, the shield plate 3000 adopts a configuration that protects the first scanner 1200 and the second scanner 2200 from high-temperature gas.

A device for emitting high-temperature gas may be installed under the shield plate 3000. In this arrangement, the shield plate 3000 serves to insulate an upper space in which the first scanner 1200 and the second scanner 2200 are provided, from heat generated in a lower space in which the device for emitting high-temperature gas is provided.

The shield plate 3000 including a thermal insulating material protects the first scanner 1200 and the second scanner 2200 from high-temperature gas. This allows a reduction in a variation in the optical characteristics of the first scanner 1200 and the second scanner 2200 due to a change in temperature and thus achieves higher inspection accuracy.

The upper space is defined as a first space in which a reader is disposed. The lower space is defined as a second space different from the first space in which the reader is disposed.

The shield plate 3000 is a mechanism that separates the first space from the second space. In other words, the first space in which the reader is disposed is protected by the shield plate 3000 from the second space containing the high-temperature gas.

Openably Closable Portion

The shield plate 3000 is preferably provided with an openably closable portion 3001*b* as described below.

Figure 6:
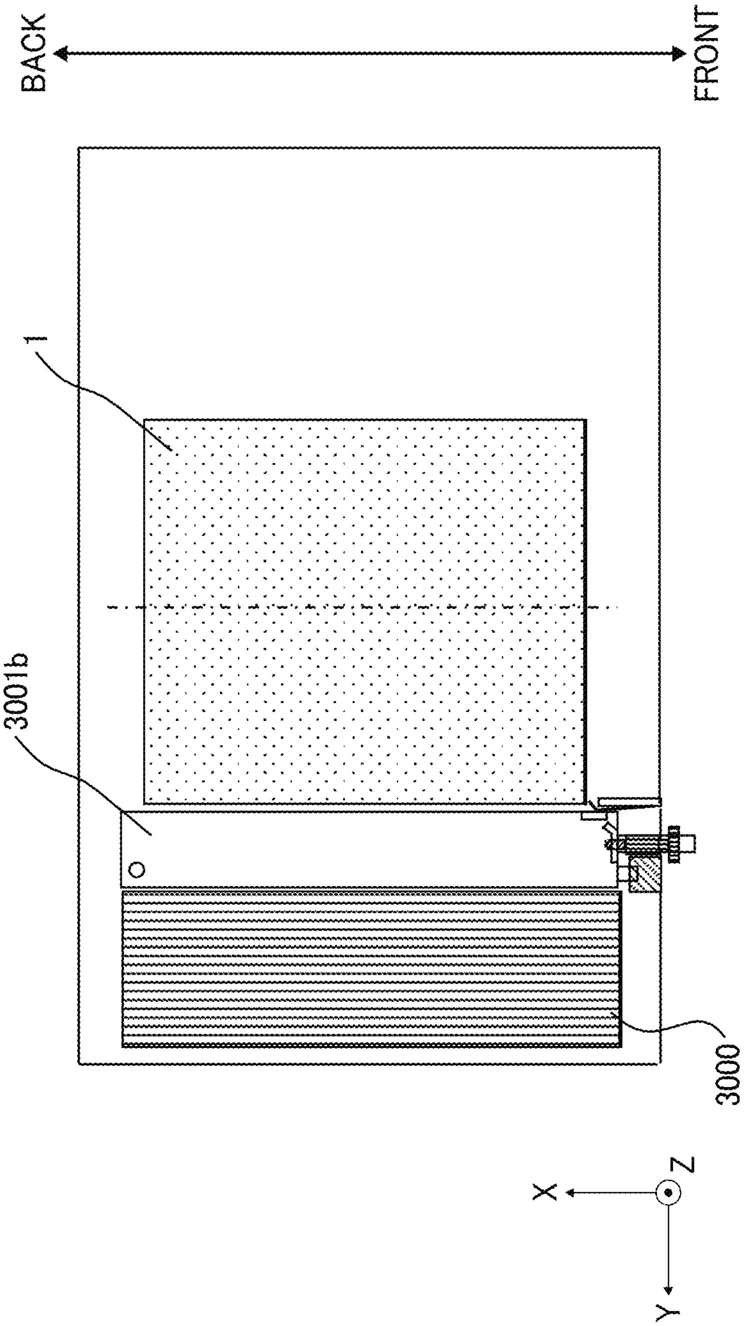
FIG. 6 is an illustration of an openably closable portion that is closed.

FIG. 6 is an illustration of an openably closable portion that is closed. As illustrated in FIG. 6, the openably closable portion 3001*b* is closed during the image-forming operation.

Figure 7:
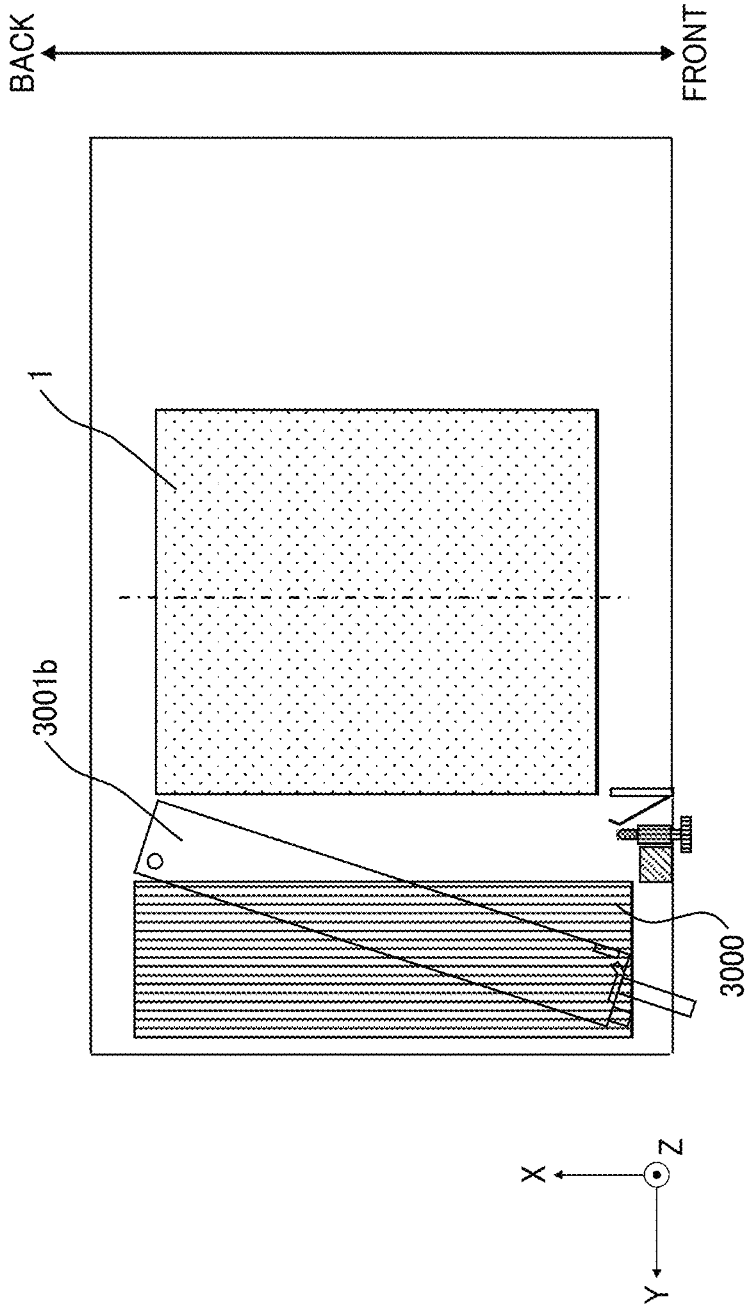
FIG. 7 is an illustration of the openably closable portion that is opened.

FIG. 7 is an illustration of the openably closable portion that is opened. As illustrated in FIG. 7, the openably closable portion 3001*b* is open during the cleaning operation.

The openably closable portion 3001*b* is a mechanism that covers a path connecting the first space and the second space. The openably closable portion 3001*b* is closed to cover the path connecting the first space and the second space and restrict the gas from moving back and forth between the first space and the second space. The openably closable portion 3001*b* is opened to uncover the path connecting the first space and the second space allows the user's hand or user's cleaning tool to reach the backside.

FIGS. 6 and 7 are bottom views of the shield plate 3000 as viewed from below, or in the Z-axis direction.

The openably closable portion 3001*b* is a part of the shield plate 3000. Alternatively, the openably closable portion 3001*b* is a mechanism independent from the shield plate 3000. In some examples, the openably closable portion 3001*b* has a shape, a degree of freedom (DOF), or a rotation center other than those described above.

Aspects of the present invention are as follows, for example.

Aspect 1

An image forming apparatus includes a housing having an opening; a drum configured to rotate around a rotation axis to convey a medium in a conveyance direction; an image former configured to form an image on the medium on the drum; and a reader downstream of the image former in the conveyance direction, the reader configured to read the image on the medium formed by the image former. The image former and the reader are radially arranged with respect to the rotation axis of the drum. The reader is drawable from the opening of the housing along the rotation axis of the drum.

Aspect 2

The image forming apparatus according to Aspect 1, further includes multiple readers including the reader, the multiple readers including: a first reader configured to read the image in a first range along the rotation axis; and a second reader configured to read the image in a second range different from the first range along the rotation axis.

Aspect 3

The image forming apparatus according to Aspect 1, further includes a support supporting and thermally insulating the reader.

Aspect 4

In the image forming apparatus according to Aspect 3, the support further includes: a first space accommodating the reader; a second space different from the first space; a path between the first space and the second space; and a shield configured to openably close the path.

Aspect 5

In the image forming apparatus according to Aspect 1, the image former discharges a liquid onto the medium to form the image on the medium. The reader includes an optical portion to read the image, and the reader is movable in a direction parallel to the rotation axis.

Aspect 6

In the image forming apparatus according to Aspect 5, a drawing movement of the reader is restricted within a predetermined distance along the rotation axis, and the predetermined distance is equal to or more of a half of an entire length of the reader along the rotation axis.

Aspect 7

An image reading device includes: a reader configured to read an image formed by an image former on a medium conveyed by a drum. The reader is: radially arranged with respect to a rotation axis of the drum; disposed downstream of the image former in a conveyance direction of the drum; and drawable along the rotation axis of the drum.

Aspect 8

A liquid discharge apparatus includes a housing having an opening; a drum configured to rotate around a rotation axis to convey a medium in a conveyance direction; a liquid discharge head configured to discharge a liquid onto the medium an image on the medium on the drum; and a reader downstream of the image former in the conveyance direction, the reader configured to read the image on the medium formed by the liquid discharge head. The liquid discharge head and the reader are radially arranged with respect to the rotation axis of the drum. The reader is drawable from the opening of the housing along the rotation axis of the drum.

The device may be multiple devices. In other words, each process may be performed in a distributed, redundant, or parallel manner.

The recording medium may be other than the sheet, which is a sheet of plain paper. Alternatively, for example, the recording medium may be a sheet of coated paper, a sheet of label paper, an overhead projector sheet, a film, or a flexible thin plate. In other words, the recording medium is made of, e.g., a material to which liquid droplets such as ink or toner are at least temporarily adherable, a material to which droplets adheres and are fixed, or a material to which ink droplets adheres and permeate. Specific examples of a recording material or formation made of such a material include, but are not limited to, a recording medium such as a sheet, a film, or cloth, an electronic component such as an electronic substrate or a piezoelectric element, which may be referred to as a piezoelectric component, layered powder, an organ model, and a testing cell. In short, the recording medium is made of any material to which liquid droplets are adherable, such as paper, thread, fiber, fabric, leather, metal, plastic, glass, wood, ceramic, or a combination thereof. Thus, the droplet discharging device may perform processing other than image formation, by discharging liquid droplets.

In addition, the “droplet” may have a viscosity or a surface tension that allows the droplet to be discharged from the head. For example, it is preferable that the viscosity is 30 mPas or less by heating or cooling at room temperature and atmospheric pressure. More specifically, the liquid may be, e.g., an emulsion, a suspension, or a solution containing e.g., a solvent such as water or an organic solvent, a colorant such as a dye or a pigment, a polymerizable compound, a functionalizing material such as a resin or a surfactant, a biocompatible material such as a deoxyribonucleic acid (DNA), an amino acid, a protein, or a calcium, or an edible material such as a natural pigment. Droplets can be used as, e.g., inks for inkjet printing, surface treatment liquids, liquids for forming electronic circuit resist patterns and components of electronic devices and light-emitting devices, and three-dimensional modeling material liquids.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

a housing having an opening;

a drum configured to rotate around a rotation axis to convey a medium in a conveyance direction;

an image former configured to form an image on the medium on the drum;

a reader downstream of the image former in the conveyance direction, the reader configured to read the image on the medium formed by the image former; and a support supporting and thermally insulating the reader, wherein the image former and the reader are radially arranged with respect to the rotation axis of the drum;

the reader is drawable from the opening of the housing along the rotation axis of the drum; and the support includes:

a first space accommodating the reader;

a second space different from the first space;

a path between the first space and the second space; and a shield configured to openably close the path.

2. The image forming apparatus according to claim 1, further comprising multiple readers including the reader, the multiple readers including:

a first reader configured to read the image in a first range along the rotation axis; and a second reader configured to read the image in a second range different from the first range along the rotation axis.

3. The image forming apparatus according to claim 1, wherein the image former includes a liquid discharge head.

4. The image forming apparatus according to claim 3, wherein the liquid discharge head comprises multiple inkjet heads.

5. The image forming apparatus according to claim 1, wherein the image former discharges a liquid onto the medium to form the image on the medium, the reader includes an optical portion to read the image, and the reader is movable in a direction parallel to the rotation axis.

6. The image forming apparatus according to claim 5, wherein a drawing movement of the reader is restricted within a predetermined distance along the rotation axis, and the predetermined distance is equal to or more of a half of an entire length of the reader along the rotation axis.

7. A liquid discharge apparatus comprising:

a housing having an opening;

a drum configured to rotate around a rotation axis to convey a medium in a conveyance direction;

a liquid discharge head configured to discharge a liquid onto the medium to form an image on the medium on the drum;

a reader downstream of the liquid discharge head in the conveyance direction, the reader configured to read the image on the medium formed by the liquid discharge head; and a support supporting and thermally insulating the reader, wherein the liquid discharge head and the reader are radially arranged with respect to the rotation axis of the drum;

the reader is drawable from the opening of the housing along the rotation axis of the drum; and the support includes:

a first space accommodating the reader;

a second space different from the first space;

a path between the first space and the second space; and a shield configured to openably close the path.

8. The liquid discharge apparatus according to claim 7, wherein the liquid discharge head comprises a single inkjet head.

9. The liquid discharge apparatus according to claim 7, wherein the liquid discharge head comprises multiple inkjet heads.

10. The liquid discharge apparatus according to claim 9, wherein the multiple inkjet heads comprise a first inkjet head, a second inkjet head, a third inkjet head, and a fourth inkjet head that discharge different colors of ink.

11. An image forming apparatus comprising:

a housing having an opening;

a drum configured to rotate around a rotation axis to convey a medium in a conveyance direction;

an image former configured to form an image on the medium on the drum; and a reader downstream of the image former in the conveyance direction, the reader configured to read the image on the medium formed by the image former, wherein the image former and the reader are radially arranged with respect to the rotation axis of the drum, the reader is drawable from the opening of the housing along the rotation axis of the drum, the image former discharges a liquid onto the medium to form the image on the medium, the reader includes an optical portion to read the image, and is movable in a direction parallel to the rotation axis, and a drawing movement of the reader is restricted within a predetermined distance along the rotation axis, the predetermined distance is equal to or more of a half of an entire length of the reader along the rotation axis.

12. The image forming apparatus according to claim 11, wherein the image former includes a liquid discharge head.

13. The liquid discharge apparatus according to claim 12, wherein the liquid discharge head comprises a single inkjet head.

14. The liquid discharge apparatus according to claim 12, wherein the liquid discharge head comprises multiple inkjet heads.

15. The liquid discharge apparatus according to claim 14, wherein the multiple inkjet heads comprise a first inkjet head, a second inkjet head, a third inkjet head, and a fourth inkjet head that discharge different colors of ink.

* * * * *